United States Patent [19]
Ankersen

[11] 3,884,161
[45] May 20, 1975

[54] WASTE DISPOSAL AND ENERGY RECOVERY REACTOR APPARATUS AND METHOD

[75] Inventor: Borge Richard Ankersen, Pontiac, Mich.

[73] Assignee: Ankersen Resource Systems, Inc., Pontiac, Mich.

[22] Filed: Sept. 17, 1973

[21] Appl. No.: 397,829

[52] U.S. Cl. .................. 110/8 A; 110/8 C; 110/10; 110/15
[51] Int. Cl. ............................................. F23g 3/00
[58] Field of Search ............. 110/8 R, 8 A, 8 C, 15, 110/10, 11

[56] References Cited
UNITED STATES PATENTS

| 490,582 | 1/1893 | McClave | 110/8 C |
|---|---|---|---|
| 2,007,657 | 7/1935 | Nielsen | 110/8 R |
| 2,592,491 | 4/1952 | Toepel | 110/8 C |
| 3,668,077 | 6/1972 | Ban | 110/15 |
| 3,675,600 | 7/1972 | Jones | 110/8 R |
| 3,678,870 | 7/1972 | Bakker | 110/8 R |
| 3,697,256 | 10/1972 | Engle | 110/8 R |
| 3,769,921 | 11/1973 | McMullen | 110/8 R |

Primary Examiner—Kenneth W. Sprague
Assistant Examiner—Larry I. Schwartz
Attorney, Agent, or Firm—Buell, Blenko & Ziesenheim

[57] ABSTRACT

A waste disposal and energy recovery reactor apparatus and method are provided for pollution free disposal of all types of organic waste materials with the continuous recovery of the reusable resources in the waste material. Such an apparatus consists essentially of a main reactor chamber in elongated horizontal form having a plurality of top covers which may be opened for receiving solid waste and a multiplicity of air injection nozzles at the bottom for injecting high velocity air along with spaced nozzles for feeding waste liquid fuels for aiding and supporting combustion of the waste.

9 Claims, 13 Drawing Figures

WASTE DISPOSAL AND ENERGY RECOVERY REACTOR APPARATUS AND METHOD

This invention relates to waste disposal and energy recovery reactor apparatus and method and particularly to a high intensity reactor and reaction process for the pollution free disposal of all types of organic waste materials generated by a modern industrial and residential community.

The problems of disposal of waste products generated by modern industrial and residential communities are so well known that they need not be repeated here. They are a major source of air and surface pollution and their disposal is becoming increasingly difficult as the society in which we live becomes more complex and affluent.

I have developed a reactor and process for the pollution free thermal disposal of all types of organic waste materials and for the recovery of all usable resources from such waste including the metallic and glassy values in solid form and the latent fuel values as steam energy. The invention is based upon the concept of depositing into the interior of the main reactor, solid waste materials as typically generated by a modern community. These materials include garbage and other organic waste from domestic sources and scrap wood and paper boxes, plastics, rubber tires, telephone poles, railroad ties, broken shipping crates, stays and props and the like solid wastes from the industries normally associated with an ordinary community.

Liquid organic wastes such as oils, paint thinners, solvents and other combustible liquids received from industrial sources are stored and injected at selected points in the reactor. High calorific fuel in liquid form from these sources is preferably injected and ignited through the first four nozzles at a control end of the reactor, remote from the stacks. Combustion through these first four nozzles will be preferably maintained at all times serving in effect as a large pilot flame for the entire reactor system and assuring ignition of all other fuels introduced into the reactor at a time when such ignition is desired. Due to the continuously sustained operation of an induced draft exhaust fan at the discharge end of the return flue, the entire reactor system will at all times operate under a substantial negative pressure. This negative pressure will cause the hot products of combustion from the liquid fuel injectors to proceed through, above and around the still unburned solid waste materials which have been deposited in the downstream portion of the main reactor. As these products of combustion come into intimate contact with the solid waste materials these solids will dry and their moisture will be drawn out through the hot gas flue exhaust duct through the air pollution control equipment and thence exhausted by the induced draft fans through the stacks.

As the moisture content of the solid waste materials is thus gradually removed the solid waste will approach a condition of complete absence of moisture. Since the hot products of combustion from the pilot fire is continuing to penetrate the solid waste materials their temperature will gradually increase to the point where the entire bulk of solid waste will proceed to pyrolize. Since heating of the solid waste is being provided entirely by completely combusted products of combustion from the pilot fire and since no oxygen is being supplied at all to the portion of the reactor in which the solid waste is stored no combustion can take place and only pyrolisis will occur releasing combustible gases from the solids. These combustible gases, primarily CO and methane, will travel through and around the stored solid waste and issue through the end of the pile toward the downstream end of the reactor. At this portion of the reactor where no solid waste is stored a high temperature cyclonic combustion is maintained by the injection of liquid high calorific fuel through the tangential air nozzles as described previously. This flame, which is of similar nature to that maintained in the upstream end of the reactor for pilot purposes, is maintained at a much higher temperature of operation, i.e. between 2,800°F. and 3,000°F. The combustible gases issuing from the stored solid wastes into this high intensity cyclonic combustion chamber will burn to absolute completion. From this very high temperature cyclonic combustion only completely combusted gases approaching 3,000°F. will proceed on into the return gas duct through the air pollution control equipment and induced draft fan and out the stack.

As the pyrolisis process throughout the entire volume of stored solid waste within the reactor approaches completion and the emission of combustible gases from its process decreases below a desirable level the high velocity air injection nozzles at the immediate end of the solid waste volume within the reactor are energized and simultaneously those nozzles in the downstream section of the reactor farthest removed from the solid waste are de-energized providing a very violent agitation and oxidation of the predried pyrolized and preignited bulk of solid waste contained within the extreme end of the stored volume. The combustion reaction resulting from this very high intensity oxidation results in temperatures approaching 3000°F. which will further stabilize very rapid ignition and combustion of the portions of the solid waste volume which will successively become exposed to this very high intensity reaction. Since the temperature thus maintained within the combustion section of the reactor is far in excess of the melting point of any of the noncombustible components of the solid wastes contained within the reactor these noncombustibles will melt and form a glassy molten slag. The air which is injected through the high pressure air nozzles enters the interior of the reactor at approximately 500 feet per second and therefore imparts to the gases within the combustion zone a very high velocity angular cyclonic motion within the cylindrically shaped reactor chamber. This very high velocity swirling motion of the combusting gases will lift the solid combustible and noncombustible materials resting on the bottom of the reactor chamber and carry these pneumatically in suspension in the hot swirling gases much like a tornado has the ability to lift trees and houses from their resting place in its path. As the combustible portions of the solid wastes complete their combustion thus suspended in the hot gases and surrounded by sufficient oxygen to complete their combustion and release their heat energy for subsequent use in stream generators elsewhere in the plant the noncombustible components will melt and remain swirling in cyclonic fashion in the hot gases. The noncombustibles which are largely $SiO_2$ and traces of metallic oxides etc., have a density of approximately 5 to 7 times that of the combustible portions. Due to their high density these molten noncombustible components will form red hot molten droplets swirling cyclonically in the gases and due to the high angular velocity these molten droplets will be forced outward in their circular motion against the hot refractory walls of the reactor. Due to their viscosity and sticky consistency in their molten state they will adhere to the hot refractory walls and after having collected in sufficient quantities will proceed to run down the refractory walls to the bottom and subsequently out through the slag discharge outlet at the bottom of the reactor and into an adjacent water quench tank. As the molten slag drops into a flowing stream of cold water within the quench tank the slag will immediately solidify and due to the severe thermal shock and its glassy nature the slag will shatter upon cooling and form small crystallized glass granules which will subsequently by hydraulically conveyed by the quench water to the discharge end of the quench tank where the granulated slag will be separated from the water in a conventional clarifying system. This granulated glass material after having been separated from the quench water may be sold to road building contractors for use as aggregate black top road material, or to building block manufactures for use as aggregate in building blocks or the so-called cinder blocks. Due to this useful and economically feasible application of the only solid residue from this operation the process can truly be termed a resource recovery system. When the granulated glass is conveyed out from the clarifier a magnetic separating system is employed to separate the samll agglomerated iron particles from the slag bulk. This iron stems from all iron components which were part of the original solid waste charged to the reactor such as refrigerators, hot water heater tanks, and automobile parts of various descriptions. This iron when melted together with the slag will tend to agglomerate into separate little iron droplets which are readily separable magnetically from the bulk of granulated glass as it is conveyed on the loading conveyor to the trucks. This iron by virtue of the melting process by which it was recovered is generally completely pure and free of any foreign materials and therefore immediately saleable and applicable to the steel melting industry as scrap.

It should be pointed out that if for any reason an insufficient quantity of high calorific fuel should be available for the operation of the pilot fire at the upstream end of the reactor as previously described the operation can be maintained in exactly the same manner as described by igniting and burning the upstream end of the solid waste pile for purposes of piloting the entire operation. If in some instances some of the combustible components of the waste materials be so large and heavy that they will not initially become airborn in the high velocity injected air they will be subject to an extremely high rate of combustion while remaining stationery in the bottom of the reactor due to the extremely high velocity of the oxygen and hot gases passing over them far in excess of that required for immediate ignition and providing an over abundance of oxygen right at the surface of these materials while they are burning.

In order to economically utilize the enormous quantities of thermal energy released by the combustion of these waste materials a number of high pressure steam generators are installed in the immediate vicinity of the return gas duct. Spaced at regular intervals of approximately 40 feet along the length of the return flue gas duct cross ducts are arranged at right angles to the return flue gas duct and of similar cross section for the purpose of conveying a proper quantity of the hot flue gases from the return flue gas duct into the entrance opening of high pressure steam generators located at these positions for the utilization of the heat energy contained in the hot flue gases by the generation of high pressure steam. Each steam generator is provided with its own gas exhaust fan and high energy wet scrubber for the purpose of cleaning the thus exhausted flue gases prior to the emission of these into the surrounding atmosphere. The steam generator exhaust fan by creating a negative pressure within the steam generator in excess of the negative pressure already present within the hot flue gas exhaust ducts below will draw a proper quantity of hot flue gases from the reaction process below through the steam generator and thereby extract the heat energy contained in these gases by transferring the heat from the hot gases through the boiler tube walls into the steam and simultaneously cool the hot flue gases and thereby make them suitable for cleaning by the high energy wet scrubbers for air pollution control purposes.

As will be readily recognized from the preceding description, this invention provides a new type of thermal reactor for the complete elimination of all types of organic waste materials and for the conversion of the inorganic components into a new useful aggregate for the construction industry. In being able to do this in a completely pollution free manner in handling all types of waste materials without any prior preparation or processing such as separating, sorting or shredding it provides four important fields of improvements over the prior art.

It will be seen from the foregoing description that the thermal reaction employed makes use of a three step process.

In obtaining complete combustion of any of these organic waste materials and accomplishing complete separation from and retention of the noncombustible remaining residue it is necessary to operate the combustion operation at very high temperatures such as employed in this operation well above the melting points of the noncombustible residue. In order to have satisfactory combustion of this nature it is a prerequisite that any moisture be removed from the particle to be burned. Since the moisture content of each individual combustible part of waste varies greatly from piece to piece it is necessary to provide an ample drying cycle prior to any combustion in order to assure complete uniformity and reliability of the combustion process itself. As is evident from the preceeding description this has been accomplished by this invention.

In order to provide completely pollution free combustion it is necessary to provide absolutely pure gases for the combustion process. This has been provided in the form of the pyrolisis step of this reaction cycle. As described above the organic components of the waste are converted to char during the cycle of pyrolisis and the useful combustible gases are driven off the organics and used to sustain the high temperature combustion reaction in the downstream end of the reactor prior to the conveyance of the high temperature combustion products to the energy extraction units such as high temperature steam generators as described. The third step in the cycle, that of the high temperature cyclonic combustion of the remaining char and the simultaneous melting of the noncombustible residue is an optional step in the effort of waste disposal inasmuch as the char could be removed from the reactor in its charred state and employed for other purposes in the chemical and other industries. In the concept of the proposed facility however, the cyclonic very high intensity combustion of the remaining char provides a very useful and extremely clean and controllable fuel for the heat supply to the steam generators and in being able to process a small quantity of the char at a time in a locally sustained very high velocity cyclonic action the reactor actually functions in a dual roll as a high energy cyclonic wet collector for particulates thereby eliminating the generation of any significant quantities of fly ash or similar particulates suspended in the hot flue gases eminating from this high intensity combustion process. By further processing these precleaned products of combustion through very high efficiency air pollution control equipment prior to the exhaustion of these gases into the surrounding atmosphere it is assured that particulate emission through the products of combustion to the surrounding atmosphere and environment by the invented plant facility will be far below the legislated limits for such particulate emissions. This combined capability of the reactor to function as a very high intensity combustion unit simultaneously with being a high energy wet scrubber at temperatures approaching 3,000°F. comprises the second field of significant improvements over the prior art. The third field of improvements as referred to above is concerned with the facilities capability of burning a very large number of different products simultaneously. For example, it is possible to feed both natural gas, oil, paint thinner, solvents, paint oil sludge, contaminated water, sewage sludge, telephone poles, rubber tires and domestic refuse all at one time. This unique ability of the reaction unit to handle this large number of products at one time enables it to always maintain a very exact heat release and therefore a stable steam output from the steam generators at all times.

Another extremely important improvement of this facility as a waste disposal facility over that of any other plant built or proposed heretofore for that purpose is the complete elimination of the need for storing any amount of solid waste or refuse materials on the property or in separate storage facilities prior to being processed and thereby making possible the elimination for the need for large expensive storage facilities and all of the associated handling equipment and serious sanitation problems associated with such storage and handling facilities.

As solid waste materials are brought to this plant in trucks these would drive directly to the charging doors of the main reaction chamber in the farthest downstream position of the main reactor to be used for the receiving of solid waste. The first trucks would discharge their load at this position and subsequent solid waste loads would be deposited in the main reactor closer and closer toward the upstream end of the main reactor until the entire usable sections of the reactor were thus filled to capacity with solid waste materials.

From the standpoint of operating economy of the plant all materials thus deposited in the reactor will never again require any handling prior to being processed. It can really be recognized that this is an extremely significant improvement over any prior art since the facilities and equipment required for material handling constitutes the biggest single cost item in plant construction and the operation of these components comprise the biggest single operating cost to the entire plant in any other plant presently existing or proposed. When one combines these extreme cost figures with the inevitable absolute requirement of maintaining all of these facilities and equipment components absolutely sanitary and clean and free of hiding places for insects and rodents one will get an impression of the tremendous significance of this area of improvements contained in this invention over any prior art. When materials are deposited in the reactor of the facility according to this invention any living organisms contained in or around the waste materials will immediately be subject to the preheated conditions existing within the reactor at the time of the deposit of the material. Furthermore the environment inside the reactor at that period of time is completely occupied by spent products of combustion in the complete absence of free oxygen thereby immediately killing any vermin which might have found its way through a load into the interior of the reactor. Furthermore since no handling equipment was employed in depositing the material in this location any sanitation problem which would be connected with the maintenance and cleaning of such handling equipment has automatically been eliminated. After the completion of the three stepped thermal reaction as described previously which takes place within the reactor the final step is the described high intensity high temperature combustion reaction which completely eliminates and removes all of the deposited materials organic and inorganic from the interior of the reactor there is obviously no residue remaining in the reactor after the completed process and thus no need for any further cleaning to be carried on.

This plant therefore embodies by far the most sanitary type of waste handling and waste disposal operation heretofore proposed or devised.

As an even further aid in maintaining the absolute ultimate in sanitary conditions in and around the plant the arrangement of the reactor doors and truck doors in the building is such that as the truck discharges its load into the reactor the negative pressure previously described being maintained within the reactor system will cause a very high volume and high velocity inward draft of outside air from the surroundings pulling any dust or odors which might be released from the truck load as it is discharged into the interior of the reactor where it is subsequently burned and destroyed with the rest of the load rather than permitting the emission of such dust and odor to the surrounding environment of the plant.

The plant is contained within an A-frame type building the structure of which provides the supports for the lifting mechanisms employed to open and close the charging covers over the reactors and quench systems. This structural steel also provides the support for the truck doors.

At the apex of the A-frame structure is located a control room which extends the full length of the building proper providing working space for four control operators each controlling and being responsible for the operation of five receiving positions for trucks directly below them. The entire control room is provided with windows facing downward and permitting the operators to look inside the trucks as they approach the dumping position to see whether they may contain items which they would consider undesirable for depositing within the reactors.

In the foregoing general description of the facility are outlined certain objectives, purposes and advantages, other objects, purposes and advantages will be apparent from the consideration of the following description and the accompanying drawings in which:

REACTOR

Referring to the drawings I have illustrated a resource recovery reactor plant which consists of a reactor 1 with main reactor chambers 2 preferably generally cylindrical and on a near horizontal axis surrounded by cylindrical refractory walls 3. The horizontal open top of reactor chamber 2 is covered by refractory lined covers 4 resting on refractory walls 3 and provided with hinge means 5 for the opening of the cover by actuating a conventional hoist means creating a pull in chain 6 exposing one section of the reactor chamber 2 which was covered by the opened cover 4 and making it available for receiving solid waste as discharged directly from waste hauling vehicle arranged in dumping position on driveway 7 above and adjacent the side of reactor 1. Receiving door 8 in plant building 9 is disposed to swing about hinge means 10 prior to the discharge of waste from a truck and in its open position provides a shield for the refractory lining of cover 4 against possible impact from waste components falling from the truck.

High pressure injection nozzle 11 are located through refractory wall 3 entering reactor chamber 2 tangentially to inject high pressure combustion air from combustion air duct 12 located adjacent reactor 1 and parallel to gas duct 14 along its full length. At least two nozzles 11 are provided at each cover location and any pair of the nozzles can be operated by the control operator to be opened or closed or any position in between full open and full closed as desired for the proper operation of the reactor. Each nozzle 11 is provided with fuel injection tubes within the nozzle for the injection of high calorific gaseous or liquid fuels for the control of the desired reaction in the reactor chamber.

As gases proceed down through the length of reactor chamber 2 to its downstream end they will be transferred to gas duct 14 lined with refractory walls 15 and proceed toward exhaust stack 16 at the opposite end of the gas duct. Gas cooling spray manifolds are provided for the cooling of the hot gases by spraying water into the gas stream. The cooled saturated gases will enter the flooded pack scrubber 18 within gas duct 14 and proceed through the scrubber while being cleaned from any particulate content to prevent any possible pollution of the surrounding environment by emissions through stack 16. Induced draft fan 19 creates a substantial negative pressure throughout the entire reactor system including gas ducts and scrubber. Due to this negative pressure any dust or odor emitted from the waste delivery trucks as they discharge their load into reactor 1 will be pulled into the interior of the reactor system by a strong inrush of outside air and disposed of under controlled conditions together with the balance of the waste. Slag generated as a molten residue from the final high temperature step of the reaction cycle will be discharged through the slag discharge openings 20 through refractory wall 3 and run by gravity into quench tank 21 below. Water 22 will quench and shatter by thermal impact the molten glassy residue forming a granular glass within the quench tank which will be conveyed to conventional water separating means outside the plant where conventional conveyor means will load the dewatered glass onto trucks for the sale of the glass as aggregate in blacktop road materials and the like. The micron sized particles of the residue which remained suspended in the gas stream leaving the reactor and which was subsequently removed from the gas stream in the flooded pack scrubber 18 are continually carried by the scrubber water down into the water return pipe 23 from which it is discharged into the quench water and handled together with the slag.

Quench water 22 discharges into quench water clarifier 24 by means of which the granulated glass is extracted from the water as described above. The clarified but warm water is conveyed through duct 25 to clear water pond 26 to assure complete settling and cooling prior to being returned through water return pipe 28. Water fountains 27 provide further cooling and aeration of the process water. Pumps 29 located in equipment room 30 recirculate the process water to the spray manifolds and slag quench systems.

High pressure forced draft fan 31 provide the high pressure combustion air through combustion air duct 12 to tangential nozzles 11 as described above. Control room 32 located at the apex of A-frame plant structure 9 is occupied by four operators each of whom control five truck receiving positions by having an overview of the truck driveway and discharge positions through windows 33 in the side of the control room.

Liquid fuel processing facility 34 contains three open top clay tanks 35 for the receiving and holding of waste oils containing substantial amounts of water and some solids. Steel storage tanks 36 and 37 are positioned within earthen dikes 38 in accordance with rules and regulations by the State fire marshalls office for the storage and blending of various flammable liquids such as paint thinners, solvents, and the like. All tanks are interconnected by conventional piping, valves, and pumps to permit the transfer of any one liquid from one tank to another to accomplish the desired blending to obtain proper BTU and viscosity qualities of the fuels prior to firing. In addition to being interconnected to the pump lines 39 all tanks are directly connected to the reactor manifold through a gravity line 40 directly to the reactor manifold enabling the plant to transfer liquids to the reactor inspite of a possible power failure.

STEAM GENERATION

Steam generators 41 are supported on plant floor 42 between the two hot gas ducts 14. Cross ducts 43 extend between gas ducts 14 providing access for the hot gases to proceed from gas ducts 14 up through the gas intake 44 at the bottom of the steam generators through the heat exchange surface 45 economizer 46 and out through steam generator exhaust fan 47 which forces the cooled gases through high energy venturi scrubber 48 for air pollution control purposes and emitting the cool cleaned gases to the surrounding atmosphere through tub stack 49.

Due to the negative pressure maintained continually within the reactor and gas duct system no hot gases will move through the steam generators unless the exhaust fan 47 is operating; to the contrary depending upon the position of exhaust damper 50 in stub stack 49 outside air will be moving in through the steam generator system to keep it cool when not operating. When exhaust fan 47 is energized it will create a negative pressure within the steam generator in excess of that prevailing within the cross duct 43 and the exact amount of hot gases required for the proper operation of the steam generator wil be exhausted through this separate exhaust system rather than through the main stacks 16. Electrostatic precipitators 41 are positioned directly over hot gas ducts 14 to facilitate the discharge of any collected particulates directly into the quench tank below thereby eliminating the possibility for any dusty material to be dispersed through the plant environment. The pre-cooled gases will be channeled through the precipitators after having passed through the cleaning operation in pack scrubbers 18.

Figures 1, 2:
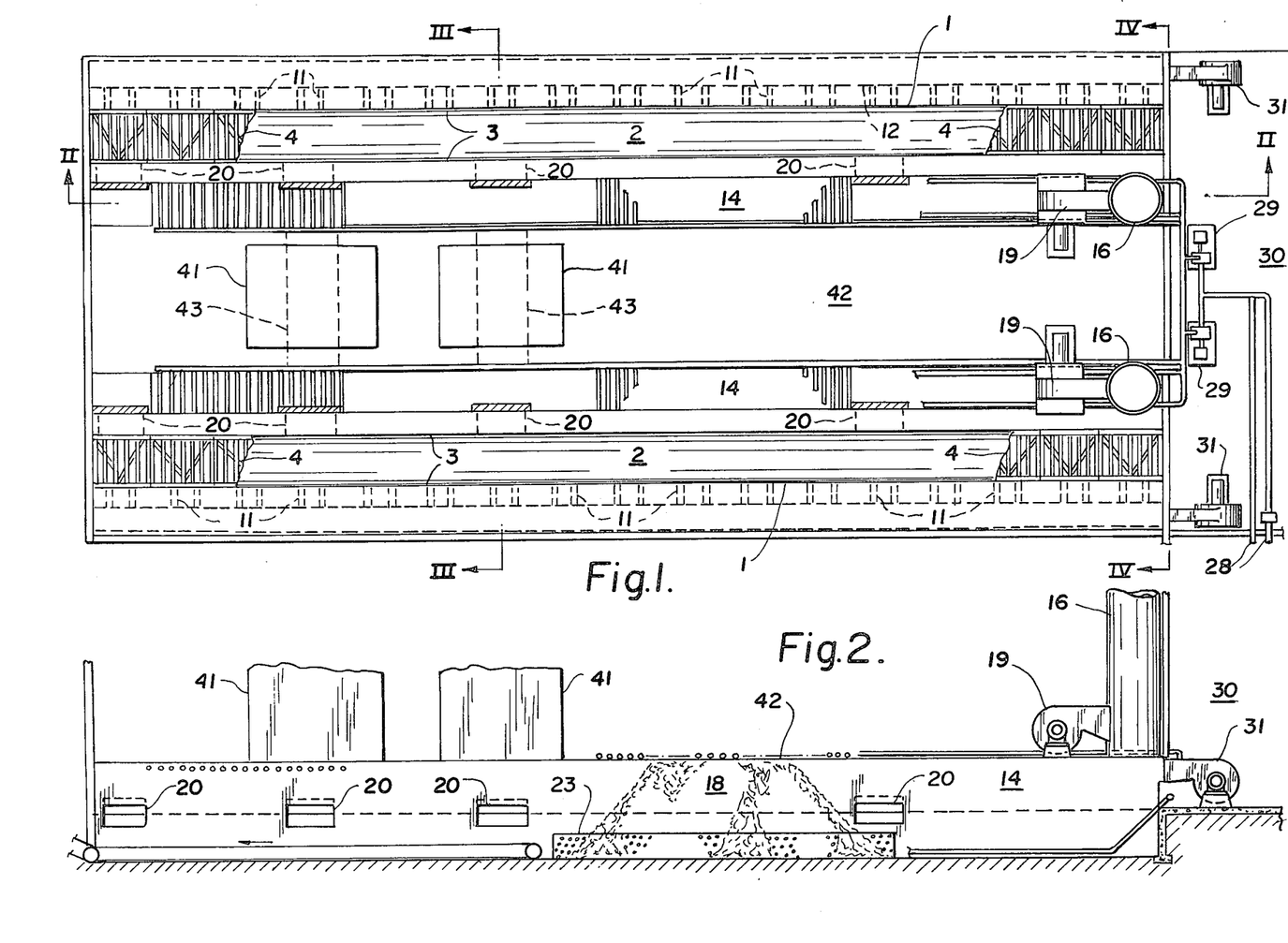
FIG. 1 is a plan view of a waste energy recovery reactor plant according to my invention.
FIG. 2 is a vertical section on line II—II of FIG. 1.
Figure 3:
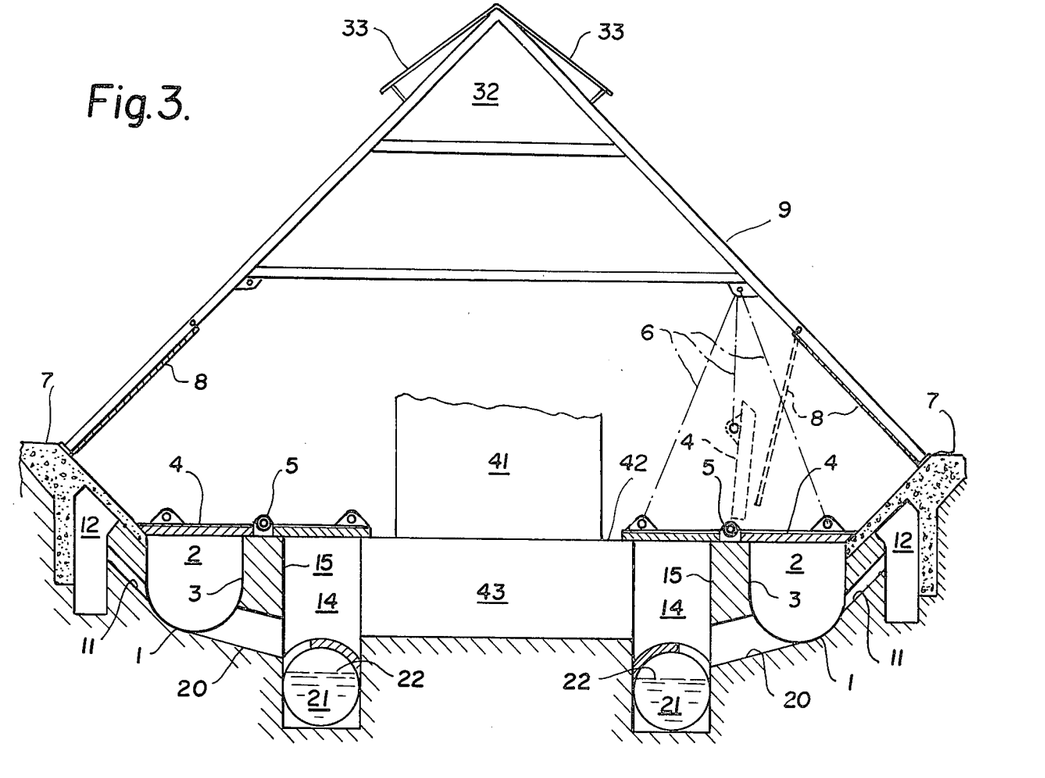
FIG. 3 is a vertical section on line III—III of FIG. 1.
Figure 4:
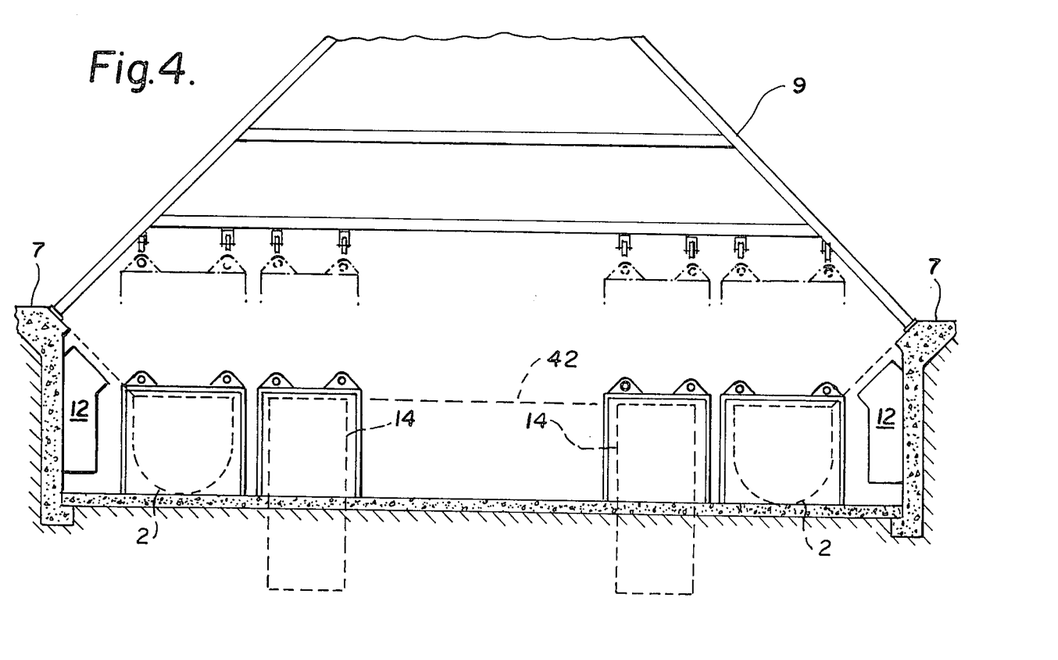
FIG. 4 is a vertical section on line IV—IV of FIG. 1 but including the driveway area adjacent to the plant.
Figure 5:
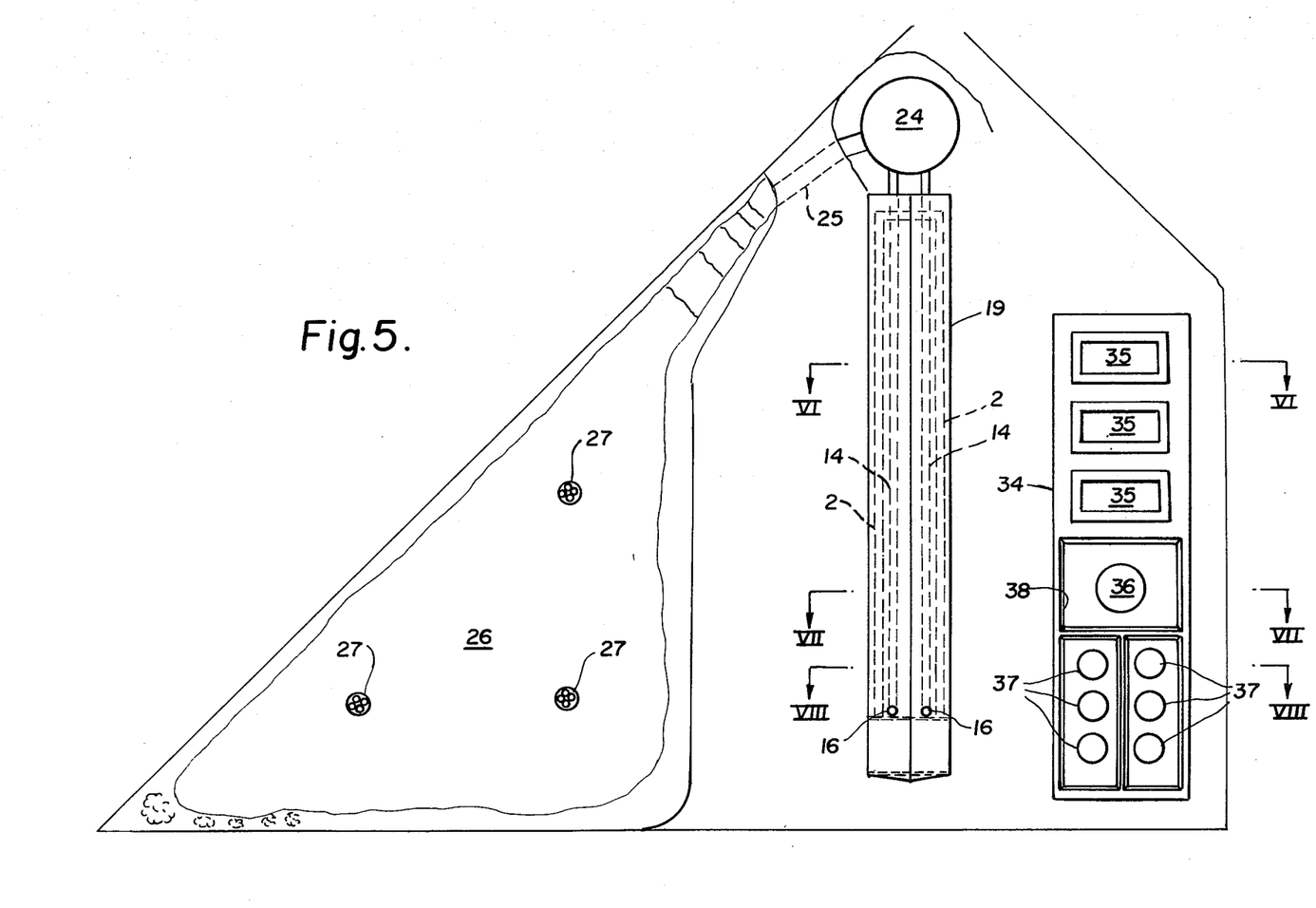
FIG. 5 is a plan view of an entire plant layout according to this invention.
Figure 6:
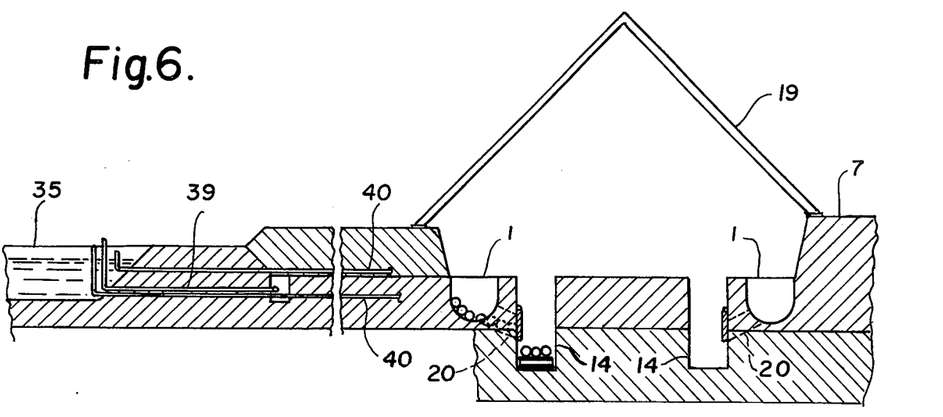
FIG. 6 is a section on the line VI—VI of FIG. 5.
Figure 7:
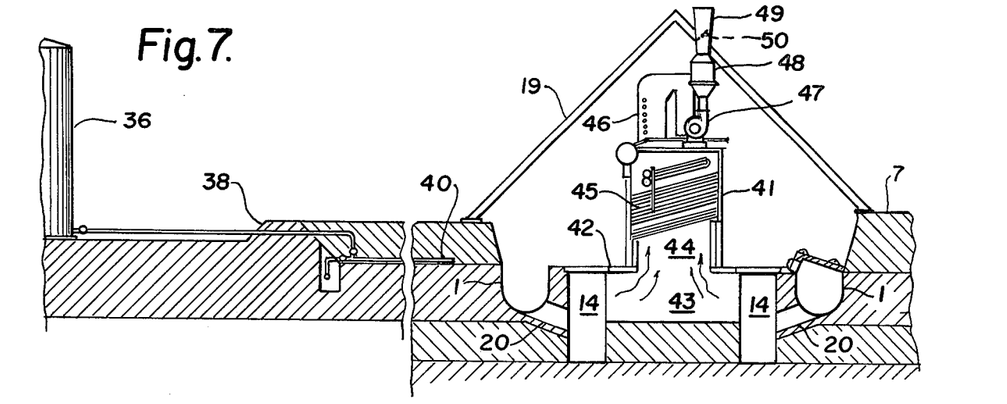
FIG. 7 is a vertical section on the line VII—VII of FIG. 5.
Figure 8:
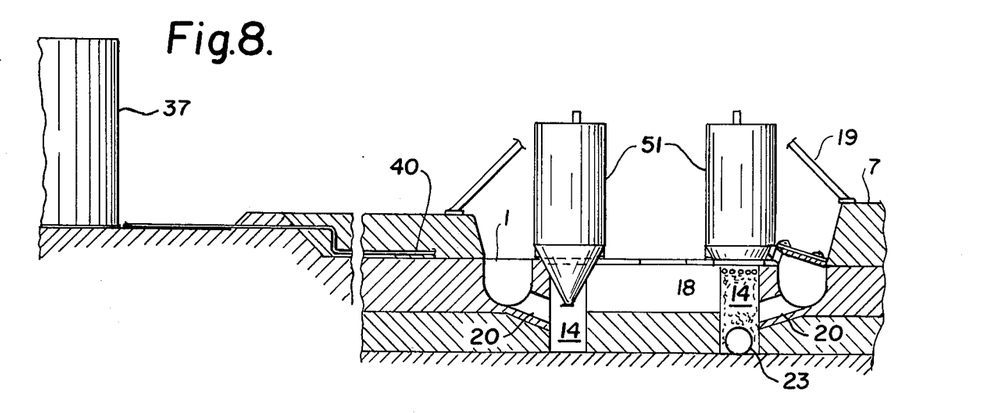
FIG. 8 is a vertical section on the line VIII—VIII of FIG. 5.
Figure 9:
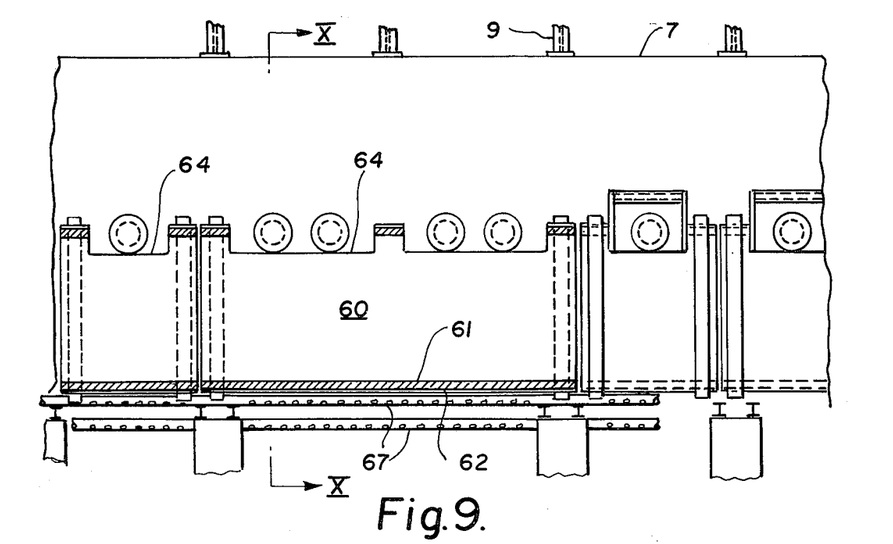
FIG. 9 is a vertical section through an alternative type of reaction vessel.
Figure 10:
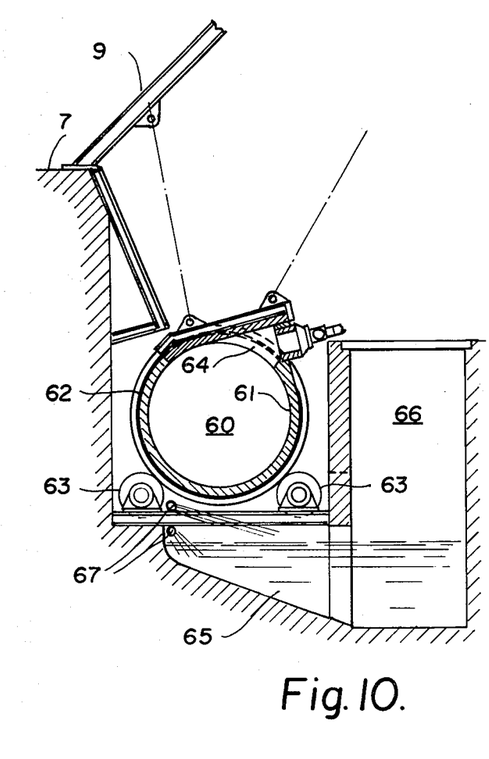
FIG. 10 is a section on the line X—X of FIG 9.
Figure 11:
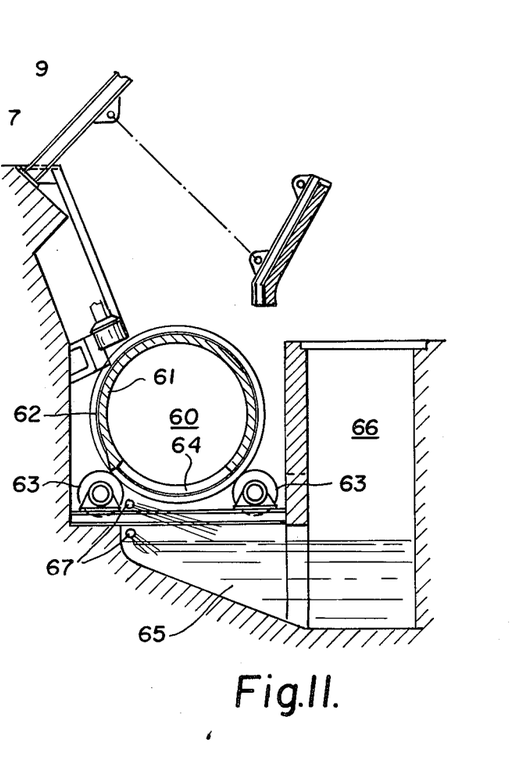
FIG. 11 is a vertical section on line XI—XI of FIG. 9.

In locations where conditions would so justify an alternate embodiment of my invention is shown in FIG. 9 where FIG. 10 and FIG. 11 are vertical sections on line X—X and line XI—XI of FIG. 9. The main reactor chamber 60, which is lined with refractory lining 61, is encased in steel shell 62 and positioned on trunnions 63 to be rotated about its horizontal axis for the purpose of discharging slag through slag discharge opening 64 as shown in FIG. 8. Slag when discharged into slag tank 65 will be hydraulically conveyed into quench tank 66 by high pressure water sprays from nozzles 67.

KILN FIRING

Figure 12:
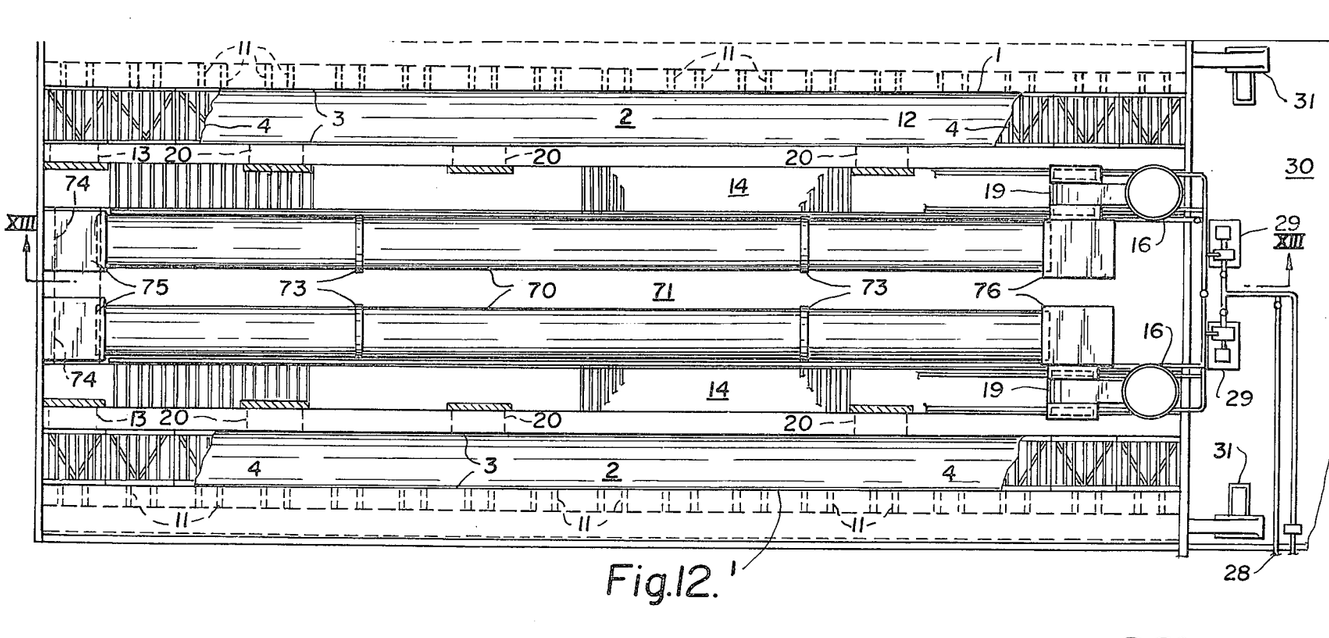
FIG. 12 illustrates an alternative embodiment of my invention in which the heat is used in cement production.
Figure 13:
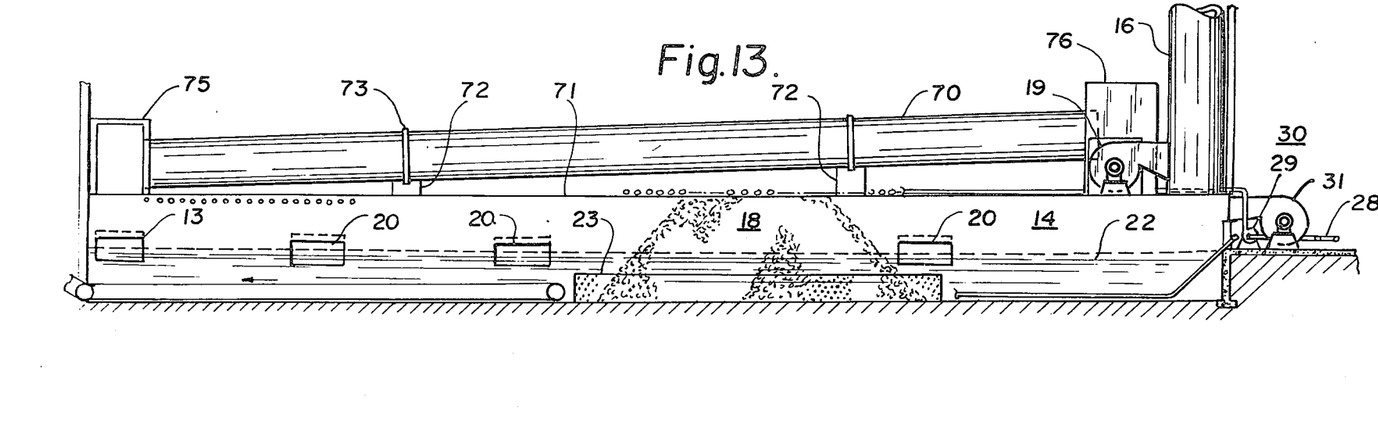
FIG. 13 is a vertical section on the line XIII—XIII of FIG. 12.

An alternate method of utilizing the heat energy developed in the main reactor 1 is shown in FIG. 12 and FIG. 13 which is a vertical section on line XII—XII of FIG. 12. Cement kilns 70 are supported on plant floor 71 in the space between gas ducts 14 and arranged with their longitudinal center lines parallel to the gas ducts. Kilns 70 are supported on concrete piers 72 and arranged in conventional manner to rotate on steel tires 73 on supporting trunnion rollers. Hot gases from reactor 1 pass through discharge opening 13 in refractory wall 3 into hot gas duct 14 and from there into cross duct 74. Kiln firing hoods 75 are positioned above duct 74 and with an open bottom arrangement disposed to receive hot gases from duct 74 and convey these into the firing end of kilns 70. The hot gases while passing through the length of kilns 70 transmit their heat energy to the crushed rock products and other chemicals being processed to cement clinker within the kiln. After thus having given off their heat to the process within the kiln the cooled gases proceed through dust settling chamber 76 and other air pollution control devices as the circumstances may required, into exhaust fan 19 which exhausts the cooled, cleaned gases through stack 16 to the surrounding atmosphere.

In the foregoing specification I have set out certain preferred embodiments and practices of my invention, however, it will be understood that this invention may be otherwise embodied within the scope of the following claims.

I claim:

1. A waste disposal unit comprising an elongated generally horizontal reactor chamber, an exhaust stack connected to one end of said chamber, a plurality of openings into the top of said chamber, closure means on said openings selectively openable for charging said reactor, a multiplicity of tangential air injector nozzles at the bottom of said chamber for injecting high velocity air into said chamber and spaced fuel nozzle means in said chamber for introducing fluid fuel therein and means selectively operating said air and fuel nozzles to maintain a pilot combustion area at the end remote from the stack, an intermediate nonoxidizing pyrolysis area between the pilot combustion area and stack and a final combustion area adjacent the stack thereby providing a preselected atmosphere in selected segments of said chamber.

2. A waste disposal unit as claimed in claim 1 wherein the openings in the top of said chamber are closed by movable doors.

3. A waste disposal unit as claimed in claim 1 wherein the air injector nozzles are directed tangentially to the bottom of the reactor chamber.

4. A waste disposal unit as claimed in claim 1 wherein waste liquid fuel container means is located adjacent the reactor chamber and connected to the fluid fuel nozzles to supply fluid fuel to said chamber.

5. A waste disposal unit as claimed in claim 1 wherein the reactor chamber is in the general form of a cylinder having a generally horizontal axis.

6. A waste disposal unit as claimed in claim 1 including steam generator units adjacent said reactor chamber, means for conducting hot gases from the reactor chamber to said steam generator units, said generator units including heat exchange means contacting said hot gases and transferring the heat therefrom to a water stream for conversion to steam.

7. A waste disposal unit as claimed in claim 1 including kiln means adjacent said reactor chamber, means for conducting hot gases from the reactor chamber to said kiln means, said kiln means being adapted to contact said hot gases with a material to be heated whereby heat is transferred from the gases to said material.

8. A waste disposal unit as claimed in claim 7 wherein the kiln means is a cement kiln.

9. A method of waste disposal and energy recovery comprising the steps of:
   a. Depositing waste in an enclosed horizontal chamber;
   b. heating said waste in said chamber in a generally nonoxidizing atmosphere to first dry and then pyrolize the same;
   c. transferring the combustible gases resulting from pyrolysis to an adjacent combustion zone and burning the same in said zone;

d. injecting air into the heated and substantially completely pyrolized waste tangentially of the chamber to burn the waste into hot gases and slag;
e. passing the hot gases from the combustion zone and the burned waste through a heat exchanging system to convert the heat therein and cool the gases; and
f. cooling and recovering the slag in a finely divided solid product.

* * * * *